C. F. A. SIMONIN.
Extracting Oleine from Fatty Matters.
No. 144,000. Patented Oct. 28, 1873.
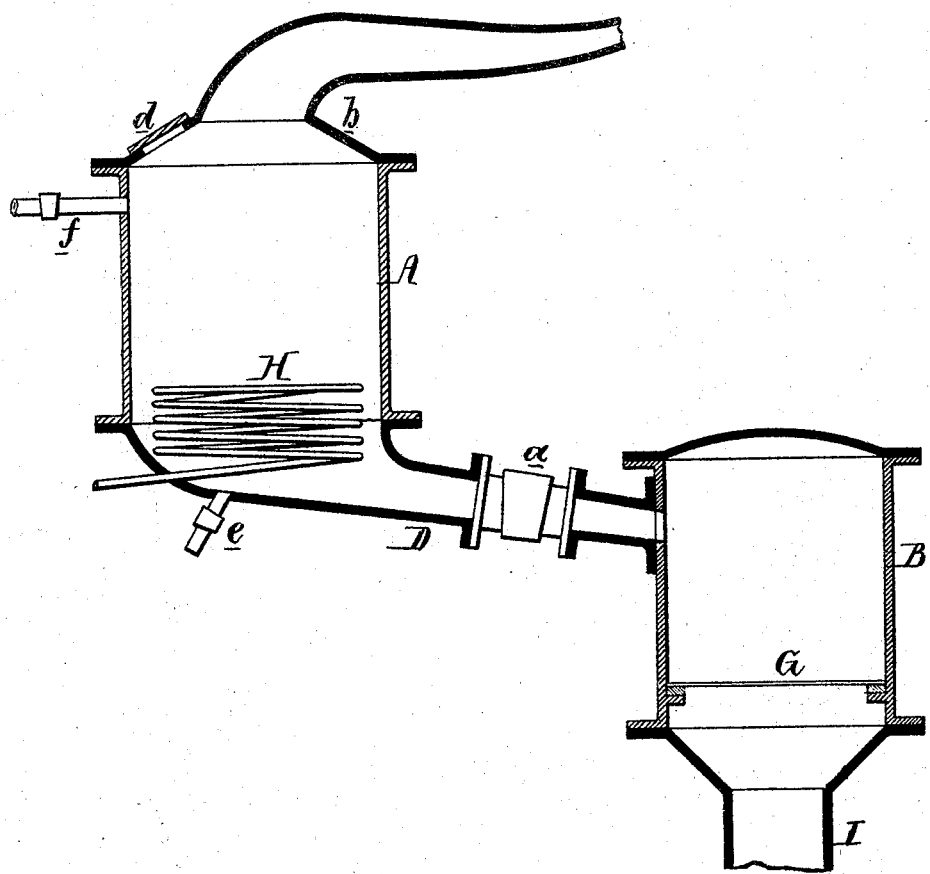

UNITED STATES PATENT OFFICE.

CHARLES F. A. SIMONIN, OF PHILADELPHIA, PENNSYLVANIA, ASSIGNOR TO WILLIAM ADAMSON, OF SAME PLACE.

IMPROVEMENT IN EXTRACTING OLEINE FROM FATTY MATTERS.

Specification forming part of Letters Patent No. 144,000, dated October 28, 1873; application filed October 1, 1873.

*To all whom it may concern:*

Be it known that I, CHARLES F. A. SIMONIN, of the city and county of Philadelphia, State of Pennsylvania, have invented an Improvement in Extracting Oleine from Fatty Matter, of which the following is a specification:

The object of my invention is to separate the oleine from the stearine of fatty matter more effectually, more readily, and at much less expense, than by the usual mechanical operation of pressure; and this object I accomplish through the agency of hydrocarbons, in the manner which I will now proceed to explain.

Tallow, lard, palm-oil, or any other animal or vegetable fatty or oily matter containing stearine, is first dissolved in hydrocarbon, by preference such as is of a volatile character—petroleum or naphtha, for instance, or benzine or gasoline—the quantity of which, in respect to the fatty matter, should be such that the density of the solution will be from 35° to 45° Baumé, according to the character of the said fatty matter. As the solution of the proper density becomes cool the stearine will crystallize, and the oleine can be readily separated from it by filtration, decantation, or slight pressure. The required solution may be made by mixing heated and melted fat with the heated hydrocarbons in proper proportions for insuring the desired density, or the fat in a cold state may be placed in a vessel containing heated hydrocarbons, or the fat may be melted in the first instance in more than the desired quantity of hydrocarbon, the surplus of which may be evaporated until the desired density is reached. The desired solution having been obtained, it is permitted to become cool, when the stearine will crystallize, and the oleine may be readily separated from it.

Different appliances may be employed for carrying the process into effect. It will suffice therefore to describe the apparatus which I prefer, and which is illustrated in the accompanying drawing, the view representing the apparatus in section.

A and B are two vessels communicating with each other through a pipe, D, furnished with a cock, *a*, or its equivalent. The cover *b* of the upper vessel A is furnished with a nozzle communicating with a condenser or cooler, and has a man-hole, *d*, after removing the cover of which the fatty matter and hydrocarbon may be introduced into the vessel, or the hydrocarbons may be introduced through a pipe, *f*. After the vessel has been closed, steam is introduced into a coil, H, the heat of which soon brings about a solution of the fatty matter in the hydrocarbon, and the density of this solution may be tested from time to time by withdrawing a portion through a cock, *e*, and by the use of the ordinary hydrometer. If the solution is not of sufficient density, the evaporation of the hydrocarbon should be continued, and if the solution is at too great a density, more hydrocarbon may be introduced to the fat through the pipe *f*, the vapor in the meantime passing off through the nozzle to the cooler, where it is condensed preparatory to being again introduced into the vessel A, when there is a demand for it. After it has been ascertained that a solution of the proper density is contained in the vessel A its contents are discharged into the vessel B by opening the cock *a*, the solution falling into a cloth-covered frame, G, which rests on ledges in the vessel, the steam in the meantime being cut off from the coil. Whatever vapor rises from the mass in the vessel B will pass off through the pipe D, and through the vessel A, to the condenser; but as the solution becomes gradually cool the vapor will be discontinued, and the oleine, with more or less hydrocarbon, will be drained through the cloth and pass off through the pipe I, the cloth and pass off through the pipe I, the crystallized stearine being permitted to remain on the cloth-covered frame until filtration ceases, when the cover of the vessel may be removed and the stearine withdrawn. A small quantity of oleine will remain with the stearine; but this can be readily extracted by a light pressure, and all traces of hydrocarbon may be removed by evaporation from the oleine which passed through the cloth-covered frame.

I claim as my invention—

The process, substantially as herein described, of separating the oleine from the stearine of fatty matter through the agency of hydrocarbon.

In testimony whereof I have signed my name to this specification in the presence of two subscribing witnesses.

CHS. F. A. SIMONIN.

Witnesses:
WM. A. STEEL,
HARRY SMITH.